Dec. 11, 1934.  F. H. RUPPEL  1,983,922
PIPE GROOVING TOOL
Filed Nov. 22, 1932  2 Sheets-Sheet 2
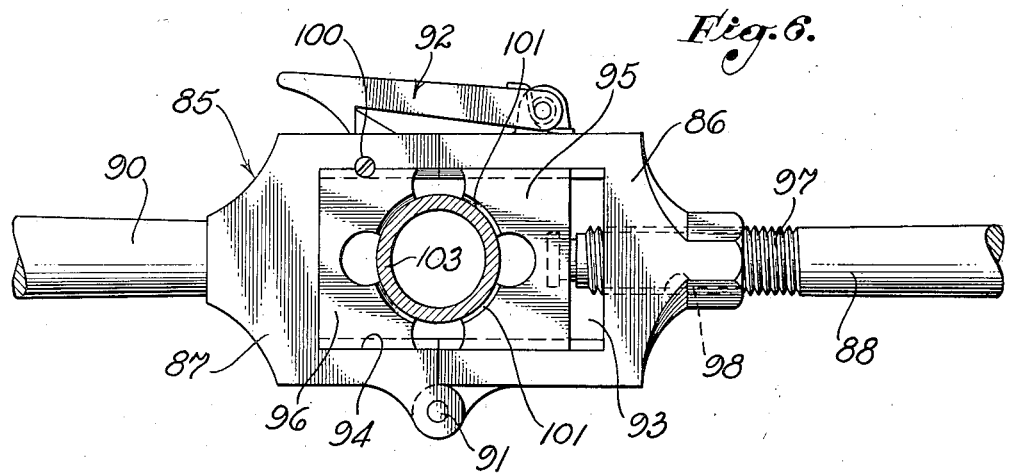
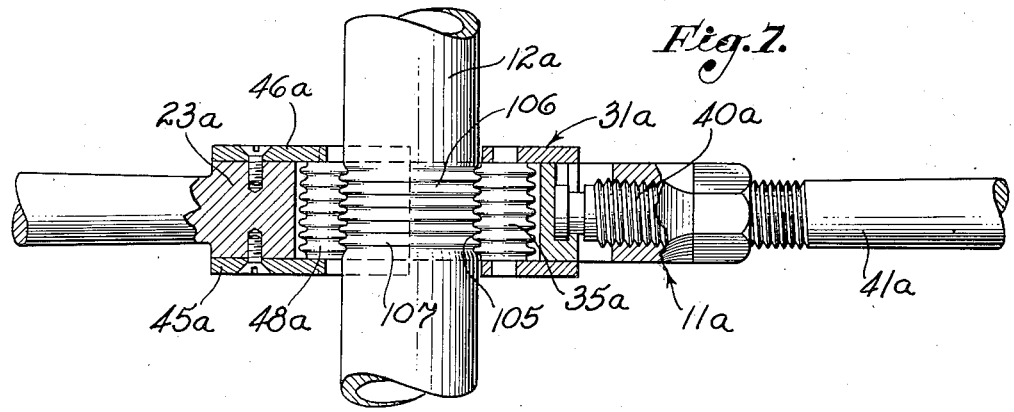
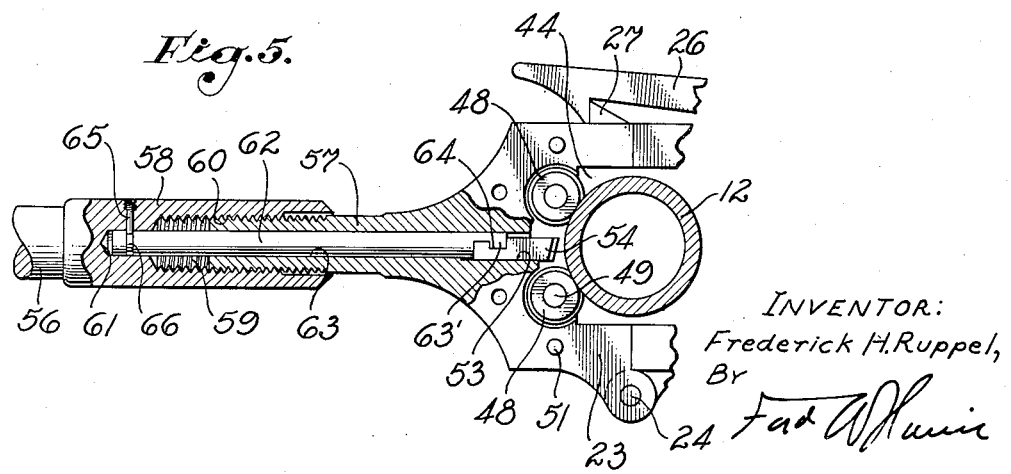
INVENTOR:
Frederick H. Ruppel,
By
ATTORNEY.

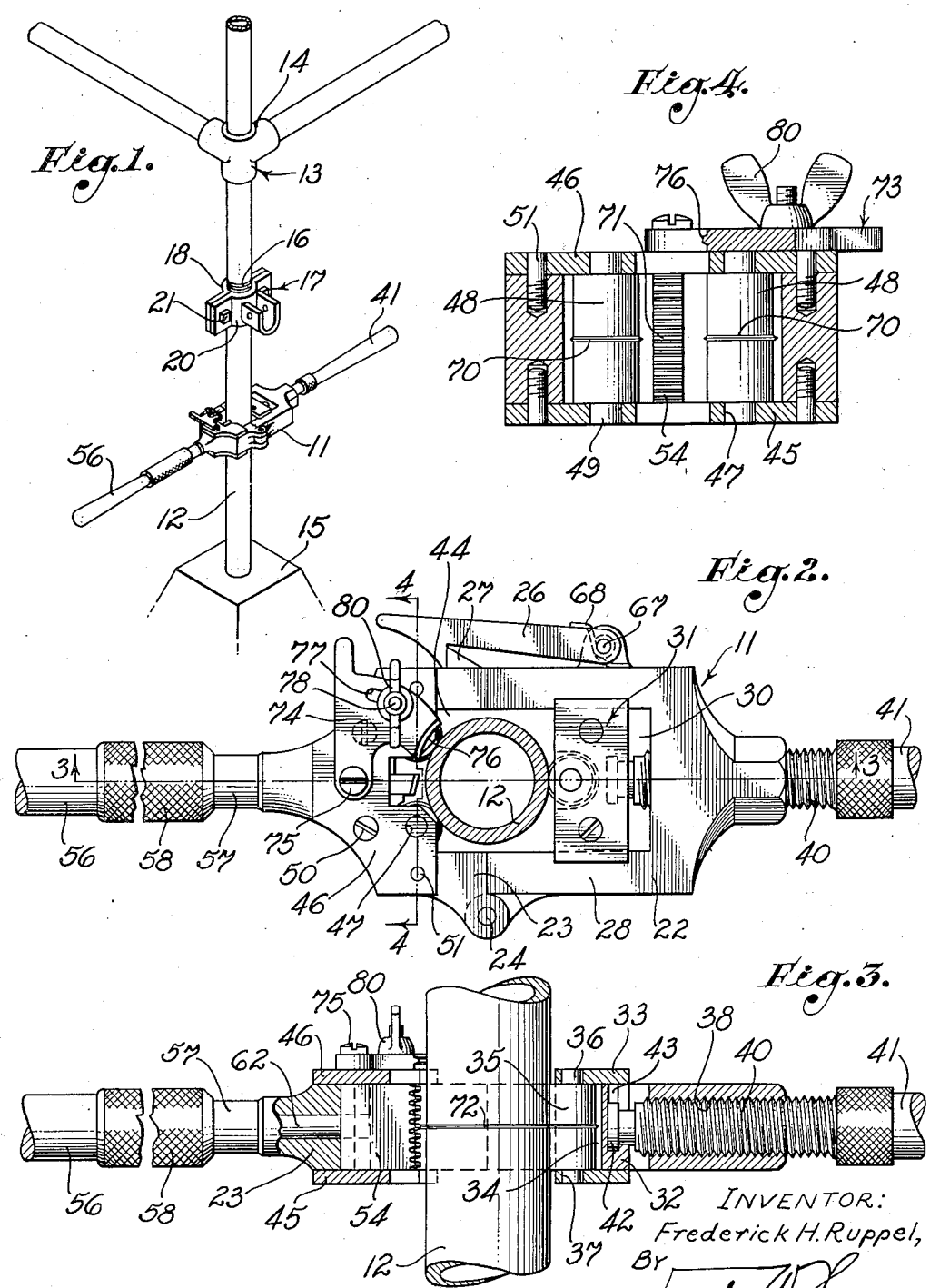

Patented Dec. 11, 1934

1,983,922

UNITED STATES PATENT OFFICE 1,983,922

PIPE GROOVING TOOL

Frederick H. Ruppel, Pasadena, Calif.

Application November 22, 1932, Serial No. 643,819

2 Claims. (Cl. 82—4)

My invention relates to a device for circumferentially grooving the surface of a cylindrical member such as a pipe. Tubular members, such as steel pipe, are especially suitable for construction of simple building structures, including one or two story residences, sheds, barns, and the like. I have found that by the use of pipe for the principal frame members of structures of this character, greater permanence and strength may be obtained as compared with the use of wood for framing purposes, and at a cost comparing favorably with the use of wood. In many instances the cost of a simple building of the above character using pipe for the frame thereof will not exceed the cost of a house constructed entirely of wood, while in other instances the cost will be greater for the pipe frame structure but the advantages of greater strength, durability, and permanence are such as to greatly offset the difference in cost over all-wood construction or over masonry construction.

My present invention concerns the providing of a means for securing various pipe members together in a facile yet permanent manner. In a frame structure for a simple building, such as a residence, there are a number of vertical posts constituting the main supporting elements, between which vertical posts horizontal members are extended. My present invention provides a means for preparing a pipe member which may be used as a supporting upright or post for the connection of other structural members thereto. Instead of cutting the post, threading the ends thereof, and inserting a pipe fitting to which a laterally extending pipe member may be connected, I circumferentially groove the face of the pipe at an intermediate point where it is desired to secure a laterally extending pipe, and clamp a suitable split fitting around the grooved portion of the pipe, this fitting having circumferential ribs or threads which engage the grooves of the pipe so that when the fitting is applied to the pipe, it cannot possibly move longitudinally upon the pipe.

It is an object of my invention to provide a simple device which may be placed around a pipe or other cylindrical member when such member is gripped in a framework, and by which device circumferential grooves, either circular or spiral, may be readily cut or formed.

It is an object of the invention to provide a device of the foregoing character having a split frame with a hinge and a latch permitting it to be closed around the pipe, this hinge carrying a groove-forming means together with means for feeding the groove-forming means inwardly against the surface of the pipe during the rotation of the frame on the pipe.

A further object of the invention is to provide a device of the foregoing character having a simple means for preventing longitudinal movement of the grooving device relative to the pipe.

Further objects and advantages of the invention will be set forth in the following part of the specification.

Referring to the drawings, which are for illustrative purposes only,

Fig. 1 is a fragmentary perspective view showing a utility of my invention.

Fig. 2 is a face view of a preferred form of the invention.

Fig. 3 is a longitudinal section on a plane represented by the line 3—3 of Fig. 2.

Fig. 4 is a cross section on a plane represented by the line 4—4 of Fig. 2.

Fig. 5 is a partly sectioned view of the leftward end of the device shown in Fig. 2 for showing the manner of feeding the groove cutter of the device, this view having the upper cover plate removed.

Fig. 6 is a face view of a device embodying my invention for forming spiral grooves intermediately upon a cylindrical member.

Fig. 7 is a longitudinally sectioned view showing a device of the character disclosed in Figs. 2 and 3 and having an alternative groove-forming means.

In Fig. 1 I show a preferred grooving device 11 embodying my invention in position on an intermediate portion of a pipe 12 forming a corner post of a frame structure 13, the upper and lower ends of the pipe 12 being respectively seated in a fitting 14 and in a concrete base 15. Above the device 11, the pipe 12 is shown with a grooved portion 16 having a fitting 17 clamped thereon, this fitting having cooperating parts 18 and 20 secured together by means such as bolts 21 around the grooved portion 16. The fitting 17 has means projecting into the grooves of the grooved portion 16 to prevent a downward movement of the fitting 17 due to vertical loads placed thereon.

The ends of the pipe 12 are blocked by the members 14 and 15 engaged thereby, so my device 11, as shown in Fig. 2, comprises cooperating parts 22 and 23 pivotally secured together by means of a hinge 24, there being a latch member 26 on the part 22 adapted to engage a projecting catch 27 when the parts 22 and 23 are in relatively closed position, to prevent opening of the device 11 during the groove-cutting operation. The part 22 has a pair of leftwardly extending bars or arms 28 defining a recess 30 in which a block 31 is slidable, this block comprising, as shown in Figs. 2 and 3, a body 32 having essentially the same height as the arms 28, and external plates 33 which project over the upper and lower faces of the arms 28 in a manner to form laterally projecting guide flanges for the body 31. In a semicircular recess 34 in the leftward face of the body 32, a cylindrical roller 35 is received, this roller having axially projecting trunnions 36 which extend into openings 37 in the plates 33. In the rightward portion of the part 22 a threaded opening 38 is formed which receives the leftward threaded end portion 40 of a handle 41. The leftward extremity of the threaded portion 40 has a flanged head 42 formed thereon which engages an undercut recess 43 in the body 32, thereby providing an engagement between the handle and the block 31 whereby the rotation of the handle 41 to advance and retract the screw 40 in the threaded opening 38 will correspondingly move the block 31 in the recess 30, this movement being for the purpose of adjusting the roller 35 against the surface of the pipe 12.

The leftward part 23 of the device 11 has a rightwardly opening recess 44 therein, and the lower and upper faces of the part 23 are fitted with cover plates 45 and 46 each of which has two openings 47 to receive trunnions 49 projecting from the ends of cylindrical rollers 48. The cover plates 45 and 46 may be secured in place by means such as machine screws 50 and dowels 51. The rollers 48 are placed at the sides of the recess 44 and rotate on axes parallel to the axis of the roller 35 and with the roller 35 are adapted to make a three-point engagement with the surface of the pipe 12. In the leftward portion of the part 23 is a vertical slot 53 adapted to receive a grooving tool 54 in the form of a flat plate having cutting teeth formed on the rightward end thereof in position to engage the surface of the pipe 12 when the blade 54 is moved rightwardly in response to the turning of a handle 56 which projects leftwardly from an externally threaded extension 57 formed on the part 23. As best shown in Fig. 5, the handle 56 has a bore 59 in the rightward end 58 thereof which is equipped with internal threads 60 to engage the extension 57. From a counterbore 61 formed in the bottom of the bore 59, a bar 62 extends rightwardly through an axial opening 63 in the extension 57, the rightward end of the bar 62 having a laterally extending toe or projection 63' adapted to engage a vertical slot 64 in the leftward portion of the cutter 54. The bar 62 is held in engagement with the counterbore 61 by means of a screw 65, the inner end of which engages a circular groove 66 in the leftward end of the bar 62. By rotating the handle 56 so as to cause the threads 60 thereof to move axially upon the extension 57, movement may be transmitted through the bar 62 to the cutter 54 to forcibly feed such cutter into cutting engagement with the surface of the pipe 12, or to retract such cutter 54, as may be desired.

The use of the device is as follows: By swinging the latch 26 outwardly upon the pivot pin 67 by which it is secured to the part 22, against the force of a spring 68, the latch 26 may be disengaged from the catch 27, whereupon the parts 22 and 23 may be swung apart on the hinge 24 into what may be termed "open" position. In such open position the parts 22 and 23 may be placed around a pipe, such as the pipe 12, and then swung into closed position to be there held by re-engagement of the latch 26 with the catch 27. The handle 41 is then rotated in right-hand direction to move the block 31 so as to carry the roller 35 into engagement with the pipe 12 and to force such pipe 12 to engage the rollers 48, thereby centralizing the grooving device upon the pipe 12. For the purpose of preventing movement of the device in the direction of the axis of the pipe 12, a small rib 70 may be formed on each of the rollers 35 and 48 in the horizontal plane of one of the teeth 71 of the cutter 54. As the rollers 35 and 48 are tightened against the pipe, the ribs 70 seat themselves in the surface of the pipe, and upon rotation of the device will form a circumferential groove or track 72, Fig. 3, thereby providing an interengagement between the rollers and the pipe 12 which will prevent movement of the device along the pipe. Means such as disclosed at 70 enables the placement of the grooving device 11 on the pipe 12 at a desired height with the assurance that after the rollers 35 and 48 are tightened against the pipe, the device will not thereafter move from the selected position. After the device has been placed in the manner previously described, the handle 56 may be rotated to forcibly feed the cutter into cutting engagement with the pipe 12 so that by rotation of the device 11 circumferential grooves will be cut in the surface of the pipe 12 by the teeth 71 of the cutter 54, it being understood that the cutter is gradually fed inwardly during rotation of the device 11 around the pipe 12 by use of the handles 41 and 56 until the desired depth of circumferential groove is obtained. The teeth 71 of the cutter 54 are so positioned that one of the grooves cut thereby will entirely obliterate the circumferential track 72 formed in the surface of the pipe by the ribs 70 of the rollers.

Should it be desired to form evenly spaced grooves in a portion of the pipe longer than the vertical dimension of the cutter 54, the grooving device 11, after the cutting of one set of grooves, may be moved to an adjacent position and another set of grooves cut thereby, the spacing of the second set of grooves relative to the previously cut grooves being determined by a gauge 73 consisting of a flat metal body 74 hinged on a screw 75 which extends into the upper cover plate 46 so that it may be swung from the position in which it is shown in Fig 2 into such position that the partial thread or rib 76 on the rightward end thereof will be brought into engagement with a groove formed in the pipe 12. The plate 74 is shown with an arcuate slot 77 through which a stud 78 extends to receive on its upper threaded end a wing nut 80 adapted to clamp the gauge 73 in operative or inoperative position.

The preferred form of the invention disclosed in Figs. 1 to 5 is adapted to cut circumferential grooves on an intermediate portion of a pipe or other cylindrical member forming part of a frame structure. Spiral grooves similar to screw threads may be employed, however, and in Fig. 6 I have shown a threading device 85 having co-operating parts 86 and 87 equipped respectively with handles 88 and 90 and being secured together in operative relationship by a hinge 91 and a latch means 92. In the recesses 93 and 94 of the parts 86 and 87 cooperating cutting dies or die blocks 95 and 96 are secured, the die block 95 being movable longitudinally in the recess 93 by means of a screw 97 formed at the inner end of the handle 88 and making threaded engagement with a threaded opening 98 in the part 86.

The die block 96 is preferably held stationary in the recess 94 by means of a locking screw 100. The die blocks 95 and 96 have cutting portions 101 in a manner similar to threading dies, and when the device 85 is closed around a pipe 103, the movable die block 95 may be fed inwardly by rotation of the handle 88 to tighten the blocks 95 and 96 against the pipe 103 and to cause the cutting portions 101 to make a desired cutting engagement therewith. In view of the fact that a continuous helical groove is cut by the die blocks 95 and 96, a grooved or threaded portion of any desired length may be formed intermediate the ends of the pipe 103.

As shown in Fig. 7, my invention also includes means whereby the grooves may be formed in the surface of the pipe by a rolling operation which displaces the surface metal of the pipe to form the grooves instead of forming the grooves by cutting the metal away. The device 11a shown in Fig. 7, in which the principal parts of the device 11 have been represented by like numerals with the suffix a applied thereto, is essentially the same as the device 11 of Fig. 3 with the exception that the cutter 54 is eliminated and the rollers 35 and 48 are respectively replaced by a roller 35a and a pair of rollers 48a, which rollers have evenly spaced circumferential ribs 105 thereon so that when the block 31a, which supports the roller 35a, is moved leftwardly in response to rotation of the screw 40a at the inner end of the handle 41a, the circumferential ribs 105 of the rollers 35a and 48a will be forced into the surface of the pipe 12a and displace the surface metal so as to form circumferential grooves 106 between circumferential ribs 107.

Although I have herein shown and described my invention in simple and practical form, it is recognized that certain parts or elements thereof are representative of other parts, elements, or mechanisms which may be used in substantially the same manner to accomplish substantially the same results; therefore, it is to be understood that the invention is not to be limited to the details disclosed herein but is to be accorded the full scope of the following claims.

I claim as my invention:

1. A device of the character described for grooving the exterior of a cylindrical member, including: a body comprising cooperating parts adapted to be placed around the cylindrical member; means for securing said parts together around said cylindrical member; handle means extending from said body for rotating same upon said cylindrical member; roller means carried by said body, there being ridge means formed on said roller means for engaging said cylindrical member to form a circular track therein to limit the axial movement of said body on said cylindrical member; means for causing said roller means to engage said cylindrical member; a grooving cutter carried by said body; and means for feeding said cutter into engagement with said cylindrical member so that said cutter will form grooves therein in consequence of the rotation of said body.

2. A device of the character described for grooving the exterior of a cylindrical member, including: a body comprising cooperating primary and secondary parts hinged together so as to be swung from open position to a closed position around said cylindrical member; releasable means for holding said parts of said body in said closed position; a primary handle extending from said primary part, said primary handle having screw means for advancing and retracting movement in response to rotation of said primary handle; a block on said primary part adapted to be moved toward and away from said cylindrical member by said screw means of said primary handle; means carried by said block for engaging said cylindrical member; a grooving cutter carried by said secondary part; secondary handle extending from said secondary part; and means operative in response to rotation of said secondary handle for advancing and retracting said grooving cutter.

FREDERICK H. RUPPEL.